UNITED STATES PATENT OFFICE.

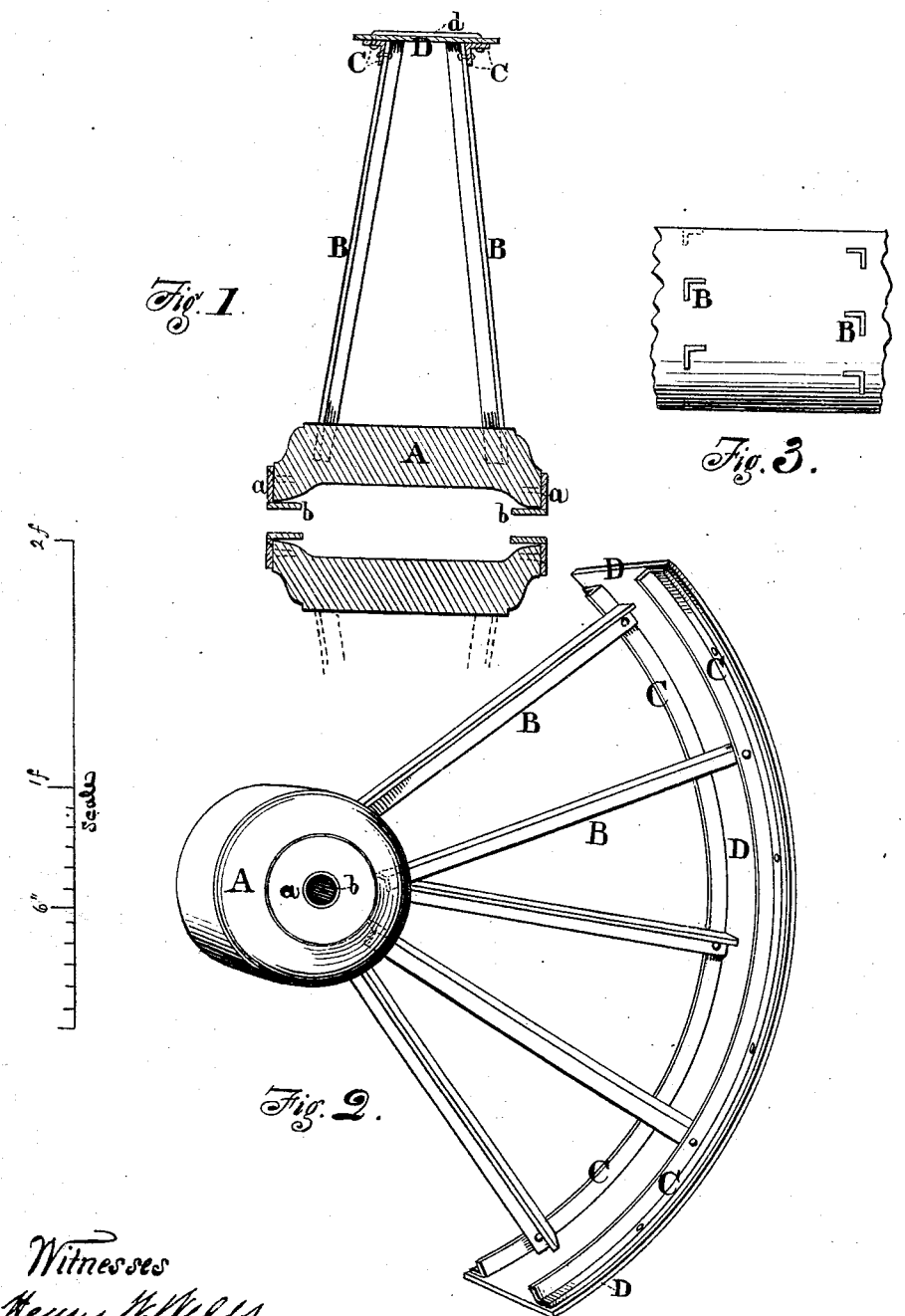

ANDREW J. HODGES, OF PEORIA, ILLINOIS.

IMPROVEMENT IN WHEELS FOR VEHICLES.

Specification forming part of Letters Patent No. 160,268, dated March 2, 1875; application filed January 15, 1875.

*To all whom it may concern:*

Be it known that I, ANDREW J. HODGES, of the city of Peoria, in the county of Peoria, in the State of Illinois, have invented an Improvement in Wheels for Harvesters, &c., or other similar machines, or for vehicles in general; and do hereby declare that the following is a full, clear, and exact description thereof, reference being had to the annexed drawings, making a part of this specification, in which like letters of reference refer to like parts, and in which—

Figure 1 represents a cross-section of the wheel; Fig. 2, a perspective view of a completed section, or one-fourth of the same; Fig. 3, a plan of the arrangement of the spokes in the hub.

This invention relates to that class of wheels which are constructed with a double row of spokes inclining from two different circles around the nave or hub, so as nearly to converge at the fellies or tire.

The object of my invention is greater economy of material and labor in constructing such wheels, and the advantage of greater strength and lightness combined; and the improvement consists in casting the base of the spokes in a continuous metal hub or nave (composed of one piece) in the mode well known to the trade.

The spokes are made of angle-iron, wrought, and set in the hub (in casting the latter) in two rows, the spoke in each row being set opposite the space between two spokes of the opposite row, and inclining inward, each bolted or riveted through their ends to a circle of fellies, also composed of angle-iron. There are two circles of fellies, of angle-iron, and the ends of the spokes are riveted to the inner face of their respective circle of fellies, so that the spokes all terminate within or between said double circle of fellies, with their ends abutting and braced against the tire, which is an ordinary tire, afterward shrunk upon the fellies when the spokes and fellies are in place, which now forms, completes, and perfects the wheel. Each row of spokes so inclined acts as a counter-brace to the opposite row, to resist the pressure of the incumbent tire when so shrunk thereon. The latter may be also united to the fellies by means of a single rod of iron crossing the periphery of the tire, and passing at either end through a hole in the latter and the felly beneath, and riveted upon the inner side of the felly.

In connection with the hub or nave I use metal boxes, set in or upon the ends of the hub, in a plate or otherwise, so as to be removable and renewable after wear upon or from the shaft or axle.

In the drawings, A represents the hub or nave of the wheel; $a$, a circular plate, in which is embedded (or firmly united) the axle-box $b$. B B represent the wrought angle-iron spokes, each presenting a flat face outward, cast solidly in the hub in separate rows, and fastened to the inner face of their respective circle of fellies C C. D represents a broad tire, which, as usual, is lastly applied and shrunk upon the fellies and the ends of the spokes.

I am aware that inclined spokes, and spokes and fellies of angle-iron, are not new, and that inclined spokes have been set or cast in double circles in a hub composed of two circular halves, and said halves drawn together by bolts or other means, to force the spokes outward from the center against the tire, to tighten the latter upon the wheel; but these forms I do not claim.

What I do claim as my invention is—

1. The double circle C C, of angle-iron, spokes B B, &c., cast in the cast-iron hub A, of one piece, all combined substantially as and for the purposes set forth.

2. The combination, with the hub A and the angle-iron spokes B B, &c., of the double circle of angle-iron fellies C C, and the tire D, substantially as described.

3. The combination of two circles of spokes, B B, set in a single hub, A, inclining together at their outer ends, the angle-iron fellies C C, and tire A, shrunk thereon, substantially as and for the purposes described.

In testimony that I claim the foregoing improvement in wheels, I have hereunto set my hand this 30th day of December, A. D. 1874.

ANDREW J. HODGES.

Witnesses:
HENRY W. WELLS,
CLARENCE THURLOW.